US006763239B2

United States Patent
Huber et al.

(10) Patent No.: US 6,763,239 B2
(45) Date of Patent: Jul. 13, 2004

(54) CONTROL UNIT FOR A TERMINAL OF A DIGITAL CORDLESS TELECOMMUNICATION SYSTEM, AND METHOD FOR SUCH A CONTROL UNIT

(75) Inventors: Holger Huber, Appenweier (DE); Christopher Stobart, Nuremberg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 596 days.

(21) Appl. No.: 09/778,867

(22) Filed: Feb. 7, 2001

(65) Prior Publication Data

US 2001/0024958 A1 Sep. 27, 2001

(30) Foreign Application Priority Data

Feb. 10, 2000 (DE) ......................................... 100 05 911

(51) Int. Cl.[7] .................................................. H04Q 7/20
(52) U.S. Cl. ..................................... 455/462; 455/550.1
(58) Field of Search .............................. 455/455, 550.1, 455/462, 465, 574, 343.1

(56) References Cited

U.S. PATENT DOCUMENTS

| 4,941,155 | A | * | 7/1990 | Chuang et al. | ............. | 375/330 |
| 5,297,203 | A | * | 3/1994 | Rose et al. | ................. | 380/270 |
| 5,978,688 | A | * | 11/1999 | Mullins et al. | ............. | 455/557 |
| 6,154,642 | A | * | 11/2000 | Dumont et al. | ............. | 455/403 |

FOREIGN PATENT DOCUMENTS

DE 19747275 A 4/1999

* cited by examiner

Primary Examiner—Nguyen T. Vo
Assistant Examiner—Alemayehu Behulu
(74) Attorney, Agent, or Firm—Aaron Waxler

(57) ABSTRACT

The invention relates to a control unit for a terminal of a digital, cordless telecommunication system, and to a method for such a control unit. In order to realize a flexible and energy-saving construction for such a control unit, according to the invention it is provided with a control signal register array (40, 50, 60) which can be loaded with events that are composed of control signals by a microcontroller (3), with a timer (43, 53, 63) for providing a clock corresponding to a time, with an instant register array (41, 51, 61) which can be loaded with different instants by the microcontroller (3), one instant thereof being presented each time as the current instant, with a comparator (42, 52, 62) for comparing the time presented by the timer (43, 53, 63) with the current instant supplied by the instant register array (41, 51, 61), and with an output register (44, 54, 64) which is controlled by the comparator (42, 52, 62), is connected to control leads, in which the current event can be written upon correspondence, detected by the comparator (42, 52, 62), between the time presented by the timer (43, 53, 630 and the current instant, and is arranged to output the control signals contained via the control leads.

8 Claims, 3 Drawing Sheets

CONTROL UNIT FOR A TERMINAL OF A DIGITAL CORDLESS TELECOMMUNICATION SYSTEM, AND METHOD FOR SUCH A CONTROL UNIT

The invention relates to a control unit for a terminal of a digital, cordless telecommunication system for delivering control signals to further units of the terminal, as well as to a method for such a control unit.

Figure 1:
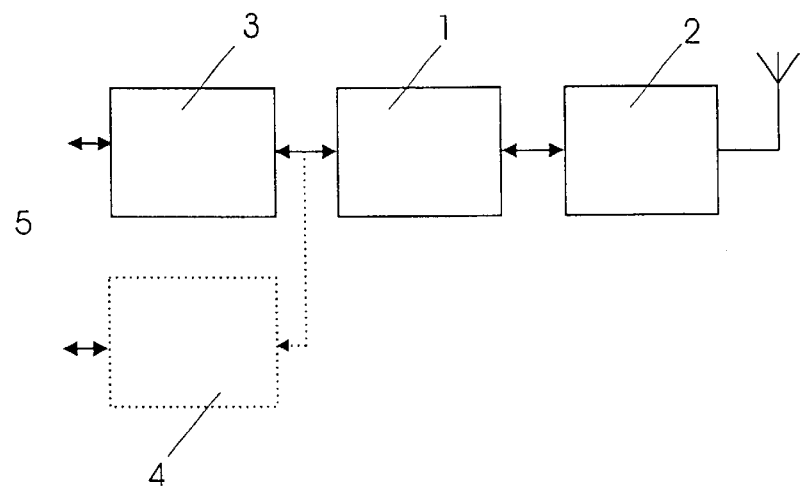

The communication between the terminals of a digital, cordless telecommunication system, notably between handsets and base stations, takes place via a radio control unit which is connected to an antenna in each terminal. The typical construction of a terminal is shown in FIG. 1. The radio control unit 2 therein is controlled by a control unit 1 (BMC: Burst Mode Controller). The control unit 1 is responsible for the time-critical processing of the data to be transmitted and received. Moreover, it outputs control signals via the control leads of the radio control unit 2. The control unit 1 itself is controlled by a microcontroller 3 which carries out the protocol functions and other, less time-critical functions. In addition, a further unit 4 may be provided for some systems, for example, for systems involving the transmission of audio data, which further unit carries out digital signal processing of the data to be transmitted or of the received data. Finally, the microcontroller 3 and the unit 4 for the digital signal processing have access to the applications 5 of the terminal.

Figure 2:
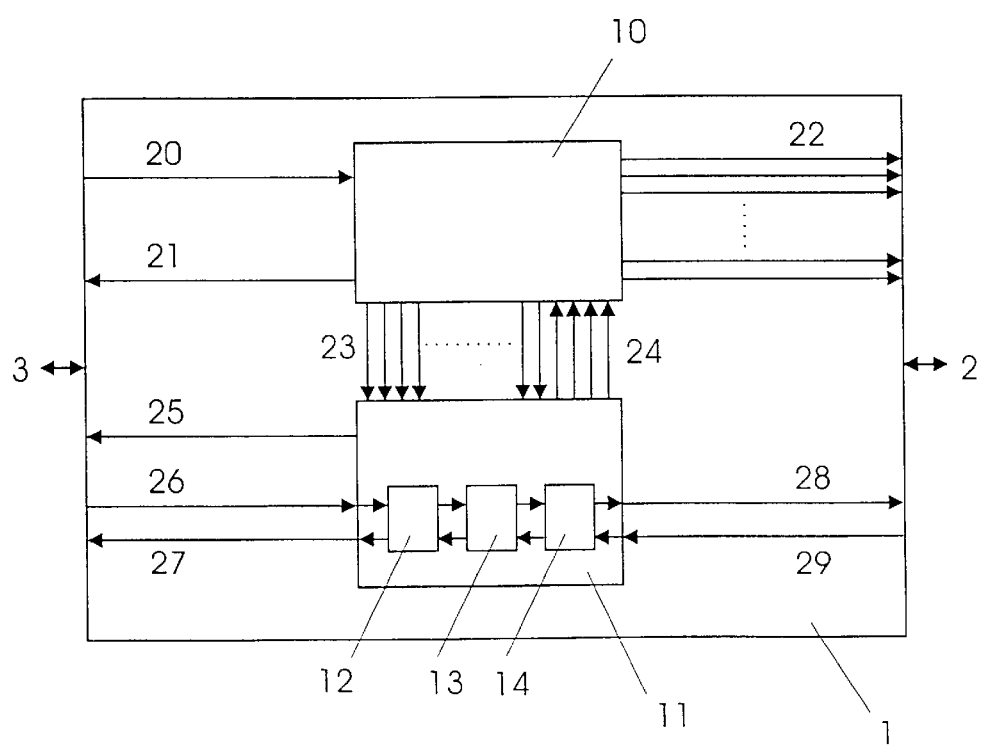

FIG. 2 shows the construction of the control device 1 in greater detail.

The main components of the control device 1 are formed by a control unit 10 and a data processing unit 11. The control unit 10 receives commands 20 from the microcontroller 3; in conformity therewith it controls the output of control signals 22, via control leads, to the radio control unit 2 and generates and outputs control signals 23 for the data processing unit 11. Moreover, the data processing unit 11 supplies the control unit 10 with feedback information 24 which can also influence the control behavior of the control unit 10. The data processing unit 11 itself is used to perform given functions on the data bits 27, 29 received and the data bits 26, 28 to be transmitted, for example, encryption (scrambling) 12, 14, or generating a test sum 13 (CRC: Cyclic Redundancy Code). In a terminal of a digital cordless telecommunication system, for example, DECT, the data to be transmitted and received must be processed in real time. The control unit 10 and the data processing unit 11 can both apply status information 21, 25 to the microcontroller 3.

The control unit of a control device is typically implemented as a hardware automatic. Therefore, problems are encountered as soon as a modification of the output of the control signals is required. For example, any change of format of the data packets necessitates a new design of the control unit, even when the same data processing functions are to be used and merely a different bit timing is desired. Similarly, the addition or removal of data processing functions as well as a modification of the specification of the radio interface or the timing for the radio control signals also necessitate a new design of the control unit. Consequently, the hardware of a control unit for a given telecommunication standard, for example DECT, can be used for other telecommunication systems, for example the United States ISM band system, only at the expense of major adaptations.

Figure 3:
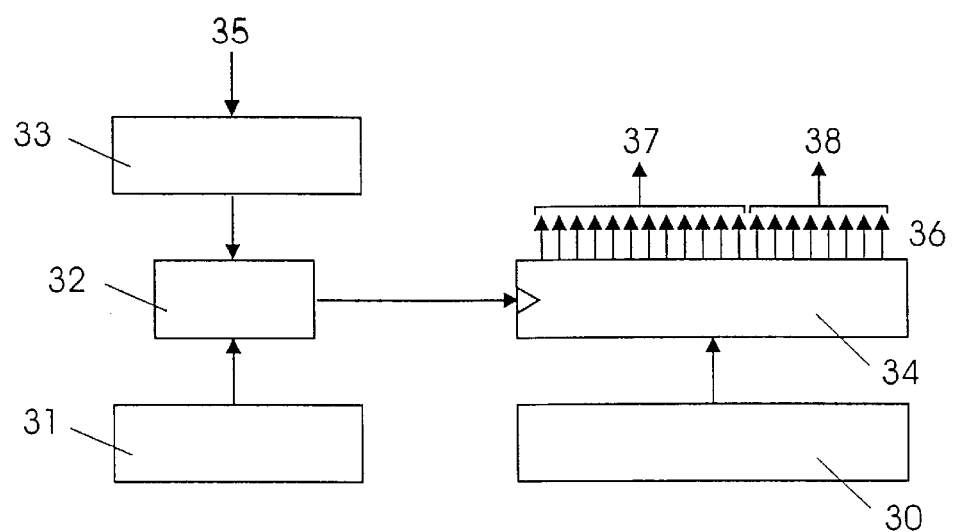

From GSM, however, a baseband control unit is known in which the hardware implemented automatic for the output of control signals is dispensed with. The unit used instead is illustrated in FIG. 3: a microcontroller writes values for an event containing control signals into a control signal register 30 and writes the values for an instant at which the control signals of the event are to be output via the control lines 36 connected to the control signal register 30 in an instant register 31. A comparator 32 continuously compares the instant of the instant register 31 with the time delivered by a timer 32. The timer 32 is controlled by a local clock generator 35. In the case of correspondence, the event is output from the control signal register 30 via an output register 34 and the control lines 36. The control lines may supply, for example, a radio control unit with control signals 38 and also apply control signals 37 to a data processing unit.

The time settings and the occupancy of the control lines thus can be selected completely at random, because the tasks of the hardware automatic were transferred to the software. Because of the use of the registers it is not necessary either for the software to imitate the actions of the hardware automatic bit by bit.

This offers an advantage, for example, when the format of data packets changes. Because the instants for transferring control signals from the control unit to the data processing unit are preset by the software, a change of format can be dealt with by way of a software modification which is far less intricate than a new design of the hardware. The addition or removal of functions of the data processing unit can also be realized by simple changes in the allocation of the individual bits of the registers to the control lines from the control unit to the data processing unit. Newly allocated significance contents and changed output times for the control lines can thus be maintained by way of pure software modification. The significance contents, the timing and the levels of the radio control signals can also be completely preset by the software, so that modifications are also possible for the radio interface without directly necessitating a new design of the hardware.

An appropriate proposal for a GSM mobile radio apparatus can be found, for example in the publication DE 197 47 275 A1.

The control units that are known from the GSM application, however, cannot be simply transferred to applications in the digital, cordless field. For example, applications such as DECT have a bit rate of 1152 kbit/s which is significantly higher than that of GSM in which the bit rate is 270 kbit/s. Moreover, DECT requires the simultaneous support of a plurality of connections. This leads to a significant amount of software processing and to real-time requirements that can hardly be met at present. For example, in the worst case a reaction time of less than the time of a bit, so less than 0.87 $\mu$s, is required. Because of the need for a minimum delay during the processing in cordless systems connected to PSTN (Public Switch Telephone Networks), on the other hand "off-line" processing of the data received, so processing not in real time, is not possible. Finally, processing steps such as encryption and checking of a test sum etc. must be performed on the data received immediately and with the timing of the signal data received. Therefore, the use of a reference time which is dependent on the local system time (as used for GSM) is not possible either.

It is an object of the invention to provide a flexible and energy-saving control unit for a terminal of a digital, cordless telecommunication system for delivering control signals to further units of the terminal. It is another object of the invention to provide a method enabling the use of a flexible and energy-saving control unit for a terminal of a cordless telecommunication system.

The object according to the invention is achieved by means of a control unit.

The object is also achieved by means of a method of using the control unit.

The control unit according to the invention and the method according to the invention are based on software control with adequate hardware support, resulting in a high flexibility while ensuring at the same time that no excessive requirements are imposed on the microcontroller performance.

The invention enables adaptations to changing secondary conditions without necessitating a new design of the hardware. It is thus simply possible to perform an adaptation to applications of different systems by appropriately adapting the events and instants delivered to the register arrays by the microcontroller. Similarly, it is possible to react to changes in units connected to the control lines, for example changes in an interface or a data processing unit, for example, when the occupancy of control line or the timing and the signal levels at the radio interface are to be changed.

Despite the increased flexibility, as a result of the use of the register arrays the invention can also be used in systems with high data rates, such as DECT, without imposing major demands on the software, because the microcontroller can load a plurality of commands at the same time and hence need not respond within the time of a single bit, so that the real-time requirements can be more readily satisfied.

Preferred embodiments of the control unit according to the invention and preferred versions of the method according to the invention are disclosed in the dependent claims.

Figure 4:
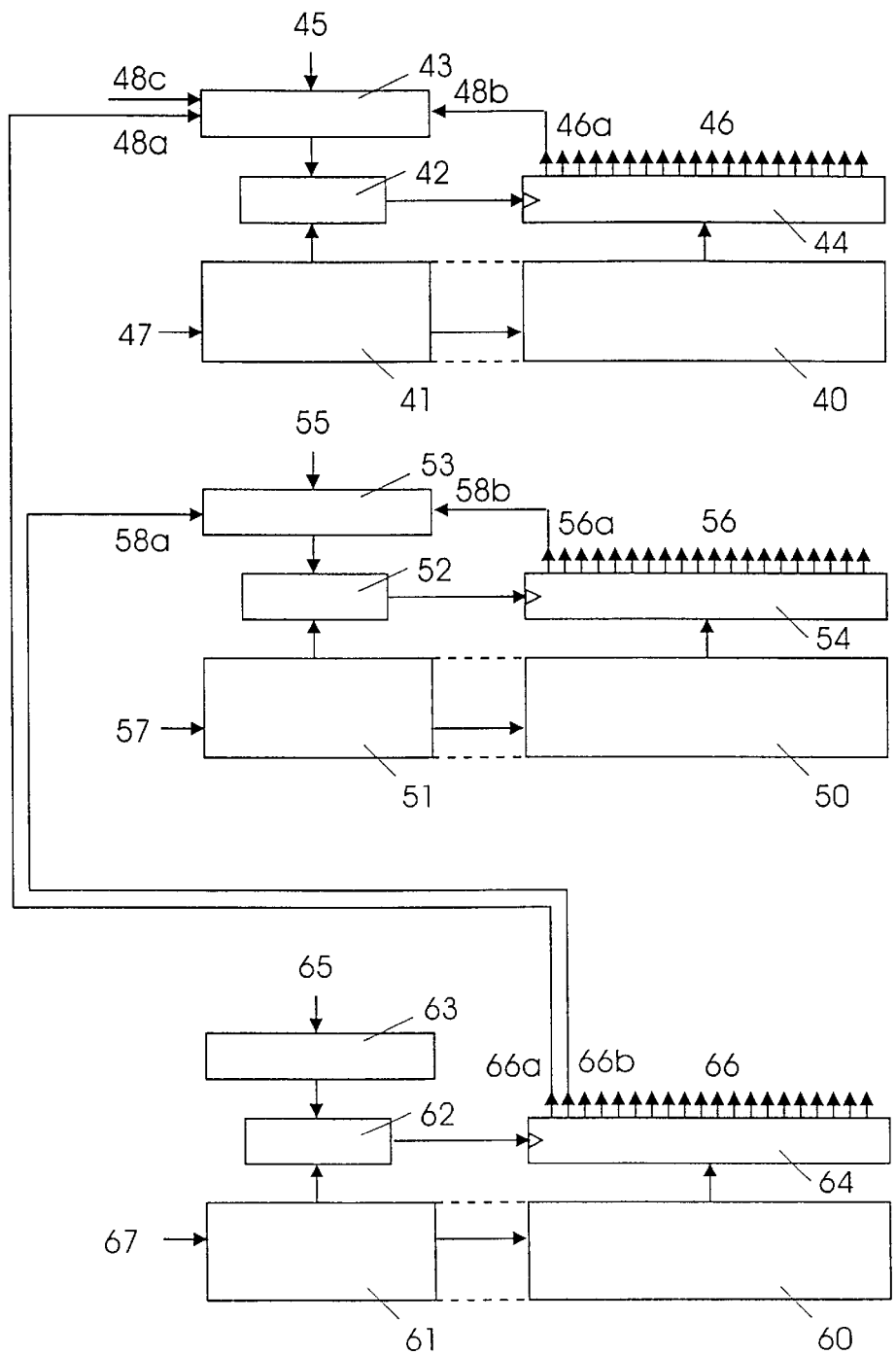

The control unit and the method according to the invention will be described in detail hereinafter on the basis of an embodiment and with reference to a drawing. Therein:

FIG. 1 illustrates the incorporation of a control device with a control unit in a terminal, FIG. 2 shows diagrammatically the construction of a control device with a control unit, FIG. 3 shows diagrammatically a control unit which is known from GSM systems, and FIG. 4 shows diagrammatically a control unit of a control device according to the invention.

The FIGS. 1 to 3 have already been described as the state of the art.

FIG. 4 shows diagrammatically the construction of a control unit 10 which is integrated in a control device 1 in conformity with FIG. 2, the control device 1 itself forming a part of a terminal in conformity with FIG. 1.

The control unit is subdivided into three sub-sections, that is, a main control section, a receiving control section and a transmission control section, all of which have a similar configuration.

Each of the three sub-sections includes a comparator 42, 52, 62 having controlling access to an output register 44, 54, 64. The inputs of the comparators 42, 52, 62 are connected to a respective timer 43, 53, 63 and an instant register array 41, 51, 61. The inputs of the output registers 44, 54, 64 are connected to respective control signal register arrays 40, 50, 60 and the outputs 46, 56, 66 to respective control leads. A microcontroller (not shown in FIG. 4) has access to the instant register 41, 51, 61 as well as to the control signal register array 40, 50, 60.

The timer 63 of the main control section is controlled by a local clock 65. The outputs 66, 66a, 66b of the output register 64 are connected, via control leads, on the one side to a radio control unit and to elements of a data processing unit, and on the other side to a respective input 48a or 58a of the timer 43 of the receiving control section and the timer 53 of the transmission control section, respectively.

The timer 43 of the receiving control section includes three further inputs 45, 48b, 48c, in addition to the input 48a connected to the output register 64 of the main control section. Via an input 45, it receives a clock extracted from the receiving data. A further input 48c is connected to a packet detection unit which is not shown. Finally, an input 48b of the timer 43 is connected to one of the outputs 46a of the output register 44 of the receiving control section. The remaining outputs 46 of the output register 44 are connected to the elements of the data processing unit which process in real time the data packets received.

The timer 53 of the transmission control section is controlled, like the timer 63 of the main control section, by a local clock 55. A further input 58b of the timer 53 of the transmission control section is connected to one of the outputs 56a of the output register 54 of the transmission control section. The other outputs 56 of the output register 54 are connected to the elements of the data processing unit which process the data packets to be transmitted.

Each of the timers 43, 53, 63 of the three sub-sections consists of a respective bit counter whose length amounts to, for example 11520. A combination of a bit counter having a length of 480 and a time slot counter having a length of 24 is also feasible for a timer in which the bit counter counts the bits within a time slot and in which a window of the time slot counter is incremented each time in response to the last bit of a time slot. However, the use of a pure bit counter offers a higher flexibility for the processing of variable time slot structures which are liable to occur in some systems, that is, when the different time slots within a window are of different length. Moreover, the use of a bit counter makes it more readily possible to take into account a plurality of clock settings simultaneously, because a second clock setting can be treated simply as a clock offset in the bit counter. When a time slot counter is used, in this case two counters are required for the offset calculations and the resultant overflow checks etc. increase the amount of software required.

The operation of each of the three sub-sections of FIG. 4 is similar to that of the control unit of FIG. 3: a comparator compares a predetermined system time with an instant from a register and realizes in dependence thereon the output of control signals from events that are stored in a further register. As a result of the subdivision of the control unit 10 into three sub-sections and the use of register arrays 41, 51, 61 and 40, 50, 60 instead of individual registers, however, significant differences occur.

Because each time a register array 41, 51, 61 and 40, 50, 60 is provided for the instants and for the events instead of a register, the microcontroller can simultaneously load several instructions that consist of an event and the associated instant. The hardware cyclically accesses the registers of the arrays 41, 51, 61 and 40, 50, 60. A pointer 47, 57, 67 indicates the current instant and the current control signal. Preferably, the pointer 47, 57, 67 is also controlled by the microcontroller. Whenever the current instant from the instant register array 41, 51, 61 corresponds to a time delivered by the timer 43, 53, 63, the control signals contained in the current event are output on the control leads, via the output register 44, 54, 64, the pointer 47, 57, 67 is set further, and the next instant and the next event will be ready. The microcontroller, therefore, need no longer respond with new data within the time of a single bit, thus enabling real-time processing even in the case of high data rates.

Further advantages result from the use of the three sub-sections. Normally speaking, from one instant to another in the associated events only the control signal for one or two of the multitude of control leads changes.

Moreover, control signals relating to the radio control usually do not occur during a time slot, that is, exactly during the processing of a data package. Due to the subdivision of the control unit into three sub-sections, the events can be distributed in such a manner that per instant only an event with a smaller number of control signals need be output. The width of the events, and hence the quantity of data to be programmed by the microcontroller for each instant, is thus substantially reduced; this has a favorable effect on the workload of the microcontroller.

According to the proposed subdivision the main control section is responsible for the output of control signals, via the control leads, to the radio control unit. Moreover, the main control section can be used to make control data available for the data processing, which data does not relate directly to bits within a data package, that is, for which synchronization with incoming data is not necessary. This may concern, for example, control signals for the switching on and off of synchronization windows; this can be performed before the reception of the first bit of a data package. The timer 63 of the main control section operates continuously. For the remainder, however, the main control section can be switched off during periods of inactivity in order to save energy.

The transmission control section controls all data processing functions that are dependent on the bit position within a data packet to be transmitted. It is active exclusively during the transmission of data packets and is activated by the main control section, via the control lead connecting the output register 64 of the main control section to the timer 53 of the transmission control section. In response to the start signal the timer 53 starts to operate in conformity with the clock of the data packets to be transmitted. Upon each new start the transmission control section starts the reading out again with the first instant stored and with the first event, but not with the last pointer position before deactivation.

The events of the transmission control section include a control signal which is applied, via the control line, from the output register 54 to the timer 53 of the transmission control section and is suitable to stop the execution of further commands until renewed activation by the main control section takes place.

The receiving control section controls all data processing functions that are dependent on the bit position within a data packet received. It is activated exclusively during the reception of data packets. The receiving control section is activated either by a control signal from the main control section in the same way as the transmission control section or by a start signal from the data processing units that are responsible for packets to be received when these units detect the start of a packet, for example by the detection of a synchronization field (synchronization field detection). Like in the transmission control section, the timer 43 of the receiving control section also starts in response to the start signal. Because the receiving control section, however, must be synchronized with the data received, a clock which does not originate from the local clock generator but is extracted from the data received is applied to the timer 43. Consequently, the data received can be processed independently of the system clock.

The receiving control section starts the reading out also in response to each restart, again with the first instant stored and with the first event. One of the control signals of the own events of the receiving control section can again deactivate the receiving control section via the control line from the output register 44 to the timer 43.

In all three sub-sections control leads can also be used to output interruption requests (interrupts) to the microcontroller, so that the microcontroller can control the various sub-sections in synchronism.

The receiving control section and the transmission control section in the described embodiment require only one respective timer 43, 53 which covers merely the length of a single packet. Therefore, these timers 43, 53 may be shorter than the system timer 63 that is used by the main control section, so that they require less storage space and less processing energy for calculation and writing. Moreover, the instants predetermined in the receiving control section and the transmission control section exhibit a given offset relative to a fixed position within a data packet, so that they are not influenced by changes of the system clock. These instants and the associated control signals can thus be stored as static data and need not always be calculated anew by the microcontroller, so that the processing load is reduced even further.

When the register arrays for the commands of the receiving control section and the transmission control section are large enough, all control signals for the entire packet format can be statically stored in these arrays. This means that reloading is not necessary during a data processing operation and that the expenditure in the microcontroller is reduced once more.

What is claimed is:

1. A control unit (10) for a terminal of a digital, cordless telecommunication system for delivering control signals to further units of the terminal, including a control signal register array (40, 50, 60) that can be loaded by a microcontroller (3) with different events that are composed of control signals, one event from among said events being selected each time as the current event, an instant register array (41, 51, 61) that can be loaded with different instants by the microcontroller (3) and is suitable to present each time the instant associated with the current event as the current instant, a timer (43, 53, 63) for setting a time corresponding to a local clock or a clock extracted from data received, a comparator (42, 52, 62) for comparing the time presented by the timer (43, 53, 63) with the current instant presented by the instant register array (41, 51, 61), and an output register (44, 54, 64) which is controlled by the comparator (42, 52, 62), is connected to control leads, and in which the current event can be written upon correspondence, detected by the comparator (42, 52, 62), between the time set by the timer (43, 53, 630 and the current instant, which output register is suitable to output the stored control signals, via the control leads, as control signals for the further units, wherein the control unit includes at least two sub-sections, each of which includes a respective control signal register array (40, 50, 60), a timer (43, 53, 63), an instant register array (41, 51, 61), a comparator (42, 52, 62), and an output register (44, 54, 64), it being possible to divide the control signals to be output between at least two events, each time one of which can be processed by one of the sub-sections.

2. A control unit (10) as claimed in claim 1, characterized in that sub-sections are provided in the form of at least a main control section for outputting control signals which do not relate directly to bits within a data packet, notably control signals for a radio control unit (2) controlling a radio interface and/or for a data processing unit (11), a receiving control section for outputting in real time control signals required for the processing of data received, and a transmission control section for outputting in real time control signals required for the processing of data to be transmitted.

3. A control unit (10) as claimed in claim 1, characterized in that
each of the sub-sections has its own timer (43, 53, 63) which is controlled either in conformity with a local clock (55, 65) or in conformity with the clock of incoming data packets (45).

4. A control unit (10) as claimed in one of the claim 1, characterized in that
a first sub-section is arranged to activate at least one further sub-section via a control signal provided in the current event of the first sub-section, and that said at least one further sub-section is arranged to deactivate itself via a control signal provided in the current event of said further sub-section.

5. A control unit (10) as claimed in claim 1, characterized in that
at least one of the timers (43, 53, 63) used is constructed as a pure bit counter.

6. A control unit (10) as claimed in claim 1, characterized in that
it is integrated, together with a data processing unit (11) for the processing of data to be received and transmitted, in a control device (1) that is constructed as a chip.

7. A terminal of a cordless telecommunication system which includes a control unit (10) as claimed in claim 1.

8. A method for a control unit (10) for a terminal of a cordless telecommunication system for delivering control signals to further units of the terminal, the control unit (10) including at least two sub-sections, each of which includes a control signal register array (40, 50, 60) which is connected to an output register (44, 54, 64) as well as a comparator which is connected to a timer (43, 53, 63) and an instant register array (41, 51, 61) with controlling access to the output register (44, 54, 64), which method includes the following steps:

a) writing different events, comprising control signals, into the control signal register array (40, 50, 60) by means of a microcontroller (3), b) writing instants associated with a respective event into the instant register array by means of the microcontroller (3), c) determining the current event and the current instant associated with the current event, d) indicating the current instant and the current control signal, e) applying the current instant to the comparator (42, 52, 62), f) continuously checking in the comparator (42, 52, 62) whether the current instant corresponds to a time value of the timer (43, 53, 63) that is continuously applied to the comparator (42, 52, 62), and g) loading, in the case of correspondence, the current event into the output register (44, 54, 64) and outputting the control signals contained therein from the output register (44, 54, 64) via connected control leads, and h) adjusting the indication of the current instant and current control signal.

* * * * *